United States Patent [19]

Pavlik et al.

[11] Patent Number: 4,808,464

[45] Date of Patent: Feb. 28, 1989

[54] INSULATING FERROMAGNETIC AMORPHOUS METAL STRIPS

[75] Inventors: Norman M. Pavlik, Wilkinsburg; John Sefko, Monroeville, both of Pa.

[73] Assignee: Westinghouse Electric Corp., Pittsburgh, Pa.

[21] Appl. No.: 186,263

[22] Filed: Apr. 8, 1988

Related U.S. Application Data

[62] Division of Ser. No. 076,974, Jul. 23, 1987, Pat. No. 4,759,949.

[51] Int. Cl.[4] ........................ B32B 15/04; B32B 15/18; B32B 17/06

[52] U.S. Cl. .................................... 428/216; 148/307; 164/123; 427/47; 428/336; 428/432; 428/433; 428/900

[58] Field of Search ............... 428/457, 432, 433, 694, 428/336, 900, 692, 216; 427/47, 127, 178, 372.2, 435; 148/307; 252/629; 164/123

[56] References Cited

U.S. PATENT DOCUMENTS

| | | | |
|---|---|---|---|
| 3,845,805 | 11/1974 | Kavesh | 164/123 |
| 4,251,285 | 1/1981 | Yoldas et al. | 148/307 |
| 4,272,588 | 6/1981 | Yoldas et al. | 428/433 |
| 4,346,131 | 8/1982 | Yoldas et al. | 428/336 X |
| 4,361,598 | 11/1982 | Yoldas et al. | 427/74 |
| 4,376,070 | 3/1983 | Pope et al. | 252/629 |
| 4,377,507 | 3/1983 | Pope et al. | 252/629 |
| 4,422,965 | 12/1983 | Chickering et al. | 252/629 |
| 4,465,739 | 8/1984 | Yoldas | 428/432 |
| 4,487,711 | 12/1984 | Pope et al. | 252/629 |

*Primary Examiner*—Thomas J. Herbert
*Attorney, Agent, or Firm*—A. Mich, Jr.

[57] ABSTRACT

A ferromagnetic amorphous metal strip insulated with a coating of glass that is about 0.001 to about 0.02 mils thick.

5 Claims, 1 Drawing Sheet

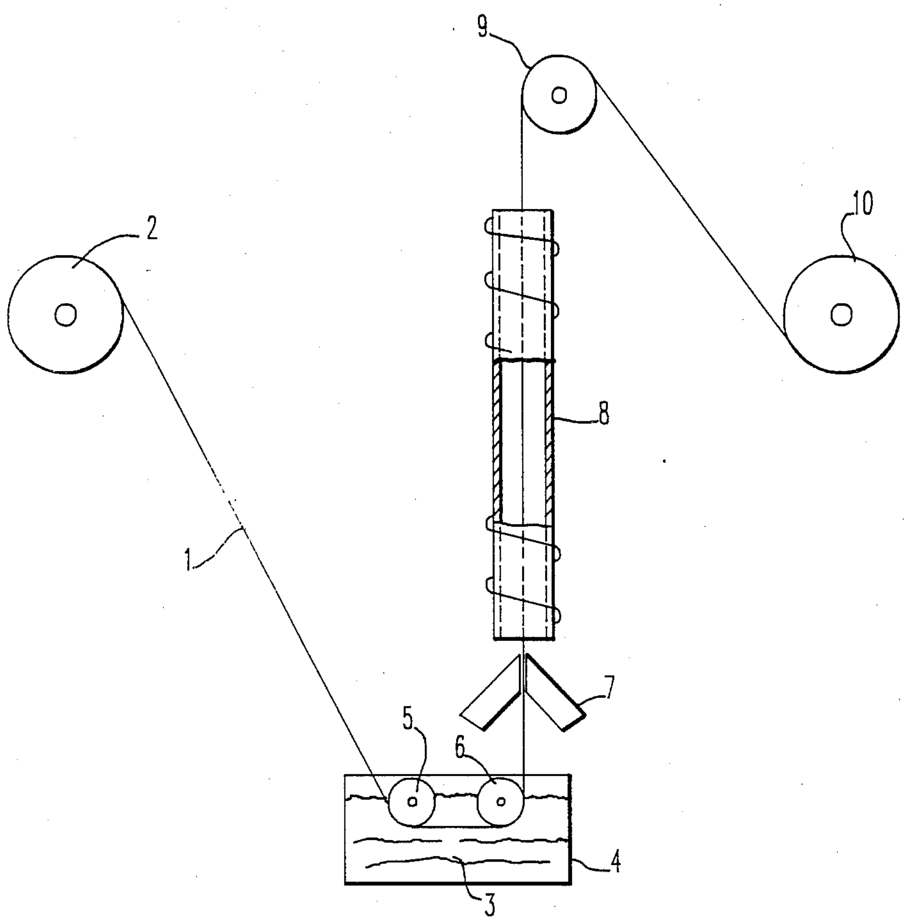
9
2
10
8
1
7
5
6
4
3

INSULATING FERROMAGNETIC AMORPHOUS METAL STRIPS

This is a division of application Ser. No. 076,974, filed July 23, 1987, now U.S. Pat. No. 4,759,949.

CROSS-REFERENCE TO RELATED APPLICATION

This application is related to application Ser. No. 902,375, filed Aug. 28, 1986, by T. E. Synder et al., entitled "Glass Insulated Conductors," now abandoned.

BACKGROUND OF THE INVENTION

Distribution transformer cores are manufactured using a continuous ferromagnetic amorphous metal strip, which is wound into a toroid or formed into a rectangular shape from cut strips. Amorphous strip is neither magnetically oriented nor stress relieved as delivered. The material is highly stressed from the casting process. The finished cores must be annealed in the presence of a magnetic field to develop the best magnetic properties and remove the internal stress induced during the manufacturing process. Annealing must be performed at a temperature under 400° C. because at higher temperatures crystallization occurs, which destroys the magnetic properties of the strip. Until now, the strip has not been insulated because no insulation material has been found which has the necessary properties, and because, at widths under about 4 inches, the metal has a sufficiently high resistivity to perform satisfactorily without insulation. However, the industry is presently moving to widths in excess of 4 inches, and it has therefore become necessary to find a satisfactory insulation for the strip.

Because the strip is more brittle and more difficult to handle after it has been annealed, and because the application of prior art coatings after annealing would induce stresses into the strip which would impair its magnetic properties, the strip must be insulated before it is annealed. Since annealing is performed at temperatures between about 350° and 400° C., the insulation must be able to withstand these high temperatures. In addition, the insulation must be extremely thin, e.g., less than 0.01 mils per side, as thicker insulation would increase the space factor and decrease the magnetic properties of the core. While organic coatings have been tried, the coefficients of thermal expansion of organic coatings differ significantly from the coefficient of thermal expansion of the strip, which induces stresses in the strip and thereby reduces the magnetic properties of the strip. Also, very few organic coatings can withstand the annealing temperatures and can be applied extremely thinly. In an alternative approach, a manufacturer of the strip recently attempted to insulate it with a fine calcium silicate dust. However, this did not prove to be entirely satisfactory because the dust was unstable, provided poor insulation, and was easily inadvertently removed during the manufacture of the core.

SUMMARY OF THE INVENTION

We have discovered that ferromagnetic amorphous metal strip can be insulated with a glass insulation that is made by hydrolyzing and polymerizing metal alkoxides. The glass insulation of this invention can be easily applied to the strip to produce a coating that is uniform and very thin (less than 0.01 mils). Despite the thinness of the coating, the insulated strip of this invention provides very good interlaminar insulation because the dielectric constant of the glass is very high. Also, the glass insulation of this invention does not degrade the magnetic properties of the strip significantly because the coefficient of thermal expansion of the glass closely matches the coefficient of thermal expansion of the strip. The dense glass insulation also resists oxidation and is stable in the oil in which transformer cores are often immersed. The glass insulation is easy to produce and uses low cost materials and a simple coating process which lends itself to high speed production. Furthermore, the curing temperature of the alkoxide glass is very low, and it is entirely stable at the annealing temperature. The glass can be applied at a uniform thickness to produce insulation having a very high dielectric constant.

DESCRIPTION OF THE INVENTION

BRIEF DESCRIPTION OF THE DRAWING

The accompanying drawing is a diagrammatic side view illustrating a certain presently preferred embodiment of the process of this invention.

In the drawing, a ferromagnetic amorphous metal strip 1 is wound off of pay-off 2 into an alkoxide glass composition 3 in container 4. The strip passes through wipers 7, which remove excess glass composition, then through heater 8, where volatiles in the composition are evaporated and the alkoxide is hydrolyzed and polymerized to form a solid glass coating on the strip. The strip passes over reel 9 and onto take-up reel 10 where it is wound to form a coil. The coil is then annealed by conventional procedures.

Ferromagnetic amorphous metal strips are generally made of iron, boron, and silicon, typically about 80% iron (all percentages herein are by weight based on total composition weight), 14% boron, and 4% silicon, but they can also contain various amounts of carbon, cobalt, nickel, and other elements. (See U.S. Pat. No. 3,845,805, herein incorporated by reference). Ferromagnetic amorphous metal strip is presently manufactured and sold by the Allied Signal Corporation under the trade designation "METGLAS" in a thickness of 1 mil and a width of 1 inches to 8 inches.

The alkoxide glass composition contains a metal alkoxide, water, a solvent for the metal alkoxide, and an acid. Any alkoxide forming metal can be used. The metal alkoxide has the general formula $M(OR)_n$, where M is the alkoxide forming metal ion, R is alkyl, and n is the valence of M. Examples of alkoxide forming metals includes silicon, boron, aluminum, titanium, hafnium, tantalum, germanium, tellurium, tungsten, gallium, nickel, strontium, yttrium, thallium, zirconium, and mixtures thereof. Silicon alkoxides are preferred as they are inexpensive, readily available, and work well. The alkyl group in the metal alkoxide is preferably from $C_1$ to $C_4$ as those alkoxides are less expensive and more available; the preferred alkyl group is methyl or ethyl for the same reasons.

The solvent is preferably an alcohol because the hydrolyzation and polymerization reactions produce an alcohol, but other solvents could also be used if desired. The alcohol is preferably the same alcohol that is produced during hydrolyzation and polymerization as that avoids the necessity of having to separate different alcohols.

The acid is preferably a mineral acid, and preferably a strong inorganic mineral acid such as sulfuric acid, hydrochloric acid, or nitric acid; nitric acid is the preferred acid as it has been found to work quite well. The presence of an acid is essential to successfully coat the strip.

The alkoxide glass composition contains about 3 to about 32% metal alkoxide, about 1.0 to about 12% water, about 56 to about 96% solvent, and about 0.001 to about 0.01% acid. We have found that the concentration of alkoxide in the composition is important to obtaining satisfactory insulation on the strip. If the concentration of the alkoxide is higher than 32%, it is difficult to control the thickness of the glass insulation on the strip so as to produce very thin insulation, and, if the insulation is too thick, it will destroy or degrade the magnetic properties of the strip as well as the magnetic properties of the core as a whole. On the other hand, if the alkoxide concentration is less than about 1.0%, the glass insulation may be too thin to provide adequate insulation. A preferred concentration range is about 2.0 to about 12% of the metal alkoxide, about 1.0 to about 4.0% water, about 84 to about 96% solvent, and about 0.001 to about 0.01% acid. It is desirable to select an alkoxide glass composition that results in a glass that has a coefficient of thermal expansion that approximately matches the coefficient of thermal expansion of the amorphous metal.

The alkoxide composition can be applied to the strip in a variety of ways, including dipping, wiping, doctor blades, rubber rollers, and reverse roll coating. After the coating composition has been applied, and excess coating has been removed from the strip, the volatiles in the composition are evaporated. While this can be accomplished at a temperature anywhere from room temperature up to the crystallization temperature of the amorphous metal (about 400° C.), the higher temperatures increase the risk of crystallizing the amorphous metal. Therefore, a temperature range of about 100° to about 150° C. is preferred as this temperature range is generally just above the boiling points of both water and the alcohol. Heat should be applied to the composition for a time sufficient to evaporate the volatiles, to solidify the coating. While we do not wish to be bound by any theories, we believe that hydrolyzation and polymerization proceed by the following reactions:

$$M(OR)_n + xH_2O \rightarrow M(OR)_{n-x}(OH)_x + xROH$$

$$y[M(OR)_{n-x}(OH)_x] \rightarrow [-M(O)_{n/2y} + xH_2O + (n-x-)ROH$$

where n is the valence of M, x is the number of alkyl groups replaced by hydroxyl groups, and y is the number of units in the resulting inorganic polymer. A more complete description of the polymerization of metal alkoxides can be found in the hereinbefore cited application Ser. No. 902,375, herein incorporated by reference, as well as in published literature.

Polymerization of the alkoxide produces a solid glass coating (after evaporation) which is sufficiently flexible to withstand the winding of the strip into a coil. The glass coating should have a thickness between about 0.001 and about 0.01 mils. While the strip can be coated on only one side, it is simpler to coat both sides at the same time as this will result in better interlaminer insulation. Since the metal strip has a nominal thickness of about 1 mil as it is currently being made (i.e., the thickness lies within the range about 0.05 to about 1.5 mils) the coating is about 0.1 to about 4 percent of the metal thickness (this is known as the percent reduction in stacking factor or lamination factor).

While the drawing shows the insulated strip being wound into a coil which is then annealed to form the core, it is also possible to cut the insulated strip into pieces, form a stack of the pieces, and anneal the stack to form a stacked core transformer. Alternatively, the insulated strip can be cut into pieces, then annealed and stacked if, for some reason, that were desirable.

The following examples further illustrate this invention.

EXAMPLE 1

The following composition was prepared:

| | Wt(g) | Concentration | % by Wt. | % by Vol. |
|---|---|---|---|---|
| $Si(OC_2H_5)_4$ | 208 | 1 Mole | 20.7 | 18.2 |
| $H_2O$ | 72 | 4 Moles | 7.2 | 5.9 |
| $C_2H_5OH$ | 727 | 15.8 Moles | 72.2 | 76.0 |
| $HNO_3$ | 0.18 | 0.003 Mole | 0.018 | 0.021 |

One and two inch wide ferromagnetic amorphous metal continuous strip was coated with the above composition, by using an apparatus similar to that shown in the drawing. The coated strip was passed through a 3 inch diameter glass tube wrapped with flexible strip heating tapes that were controlled by a thermocouple. The coating was cured at a temperature between 100° and 130° C. The thickness of the coating on the strip was controlled by changing the speed of the strip through the bath. After curing at the above temperatures, the coated strip was collected at the take up mandrel as shown in the drawing, then evaluated for interlaminar resistance, insulation thickness, and magnetic properties.

The coated coils were evaluated for interlaminar resistance by conducting tests at various intervals throughout the coated coils. Tests were conducted using the standard Franklin tester, in accordance with ASTM A717, at 200 psi test pressure.

Magnetic properties of the coated material were obtained by conducting magnetic tests on tape wound test toroids. The toroids were prepared by winding the coated material on ceramic bobbins, per standard practice. The toroids were then annealed in a circumferential magnetic field (10 Oensted) at 370° C. in an argon atmosphere. Magnetic tests were conducted over a range of magnetic inductions (2 to 15 kilogausses), 60 Hz, and evaluated for core loss (watts/lb), exciting power (VA/lb) and peak permeability. The following table gives a summary of magnetic test results for cores of various coating thicknesses and interlaminar insulation value.

The table shows that for an alkoxide glass coating thickness of 0.01 mils the interlaminar resistance is more than adequate (10 $\Omega \cdot cm^2$/laminate versus 2-3 $\Omega$ $cm^2$/laminate for typical mill glass grain oriented steel) and that the core loss is the same as that for a companion core with no applied coating. However, the exciting power is still somewhat greater, indicating that a thinner coating may be desirable. The table also shows that at thicknesses of 0.015 mil and greater the exciting power increase is related to the thickness. The AC peak permeability was similarly affected.

| Glass Thickness (mils) | Interlaminar Resistance (Ω-cm²/lamination) | B = 13 Kilogausses Core Loss (W/lb) | Exciting Power (VA/lb) | Peak Permeability (ACμ) |
|---|---|---|---|---|
| 0.01 | 10 | 0.12 | 0.21 | 50,600 |
| 0.015–0.03 | 11 to ∞ | 0.12 | 4.1 | 3,100 |
| | | 0.16 | 0.54 | 17,300 |
| No coating | — | 0.12 | 0.14 | 104,600 |

EXAMPLE 2

Example 1 was repeated using different concentrations of silicon tetraethyloxide at a molar ratio of one mole alkoxide to 4 moles of water. The following table gives the concentrations of $Si(OC_2H_5)_4$ used and the interlaminar electrical resistance of the resulting coating. The wet film thicknesses of the various coatings were held constant at approximately 1 ft/min.

| $Si(OC_2H_5)_4$ Concentration (g/g of Solution) | Interlaminar Resistance (Ω-cm²/lamination) |
|---|---|
| 31.9 | 433 |
| 25.2 | 36 |
| 20.7 | 7.7 |
| 12.0 | 2.1 |
| 6.5 | 1.4 |
| 3.4 | 0.9 |
| 0.0 | 0.0 |

The above table shows how the interlaminar resistance increases with increase in alkoxide concentration with constant wet film thickness.

EXAMPLE 3

The following composition was prepared for coating larger quantities of amorphous metal strip at relatively high coating speeds.

| | Concentration | | | |
|---|---|---|---|---|
| | Wt(g) | Mole | % (wt) | % (vol) |
| $Si(OC_2H_5)_4$ | 208 | 1.0 | 3.4 | 2.9 |
| $H_2O$ | 72 | 4.0 | 1.2 | 0.93 |
| $C_2H_5$ O5 | 5813 | 126 | 95.4 | 96.2 |
| $HNO_3$ | 0.42 | 0.007 | 0.007 | 0.004 |

Approximately 300 lb of 4" wide amorphous metal strip was coated with the above composition, by using an apparatus similar to that shown in the drawing. Coating speed was approximately 25 ft/min. A felt-nylon squeegee was used to give the proper wet film thickness. The strip was cured at approximately 130° C. and collected on the take-up mandrel.

Measurements of magnetic properties, interlaminar resistance, and glass coating thickness are shown in the table below. A companion uncoated test toroid is shown for comparison.

| Glass Thickness (mils) | Interlaminar Resistance (Ω cm²/lamination) | Magnetic Properties @ B = 13 Kilogausses Core Loss (W/lb) | Exciting Power (VA/lb) | Peak Permeability (ACμ) |
|---|---|---|---|---|
| 0.001-0.005 | 1.9 to 3.1 | 0.074 | 0.13 | 89,700 |
| No Coating | — | 0.083 | 0.22 | 56,000 |

The table shows that for a coating thickness of 0.001–0.005 mil, the interlaminar resistance is adequate and that the core loss, exciting power, and peak permeability are superior to the companion uncoated core.

We claim:

1. A ferromagnetic amorphous metal strip insulated with a coating of glass where said coating is about 0.001 to about 0.02 mils thick.

2. A strip according to claim 1 wherein said strip is about 0.5 to about 1.5 mils thick.

3. A strip according to claim 1 wherein said glass is silicon dioxide.

4. A transformer core comprising a coil of a ferromagnetic amorphous metal strip about 0.5 to about 1.5 mils in thickness, insulated with glass about 0.001 to about 0.02 mils thick.

5. A transformer core according to claim 4 wherein said glass is silicon dioxide.

* * * * *